United States Patent
Runge et al.

(10) Patent No.: US 6,452,499 B1
(45) Date of Patent: *Sep. 17, 2002

(54) WIRELESS ENVIRONMENTAL SENSOR SYSTEM

(76) Inventors: Thomas Henry Runge, 51 Cowart Ave., Manasquan, NJ (US) 08736; Bruce Martin Downie, 601 Plainsboro Rd., Plainsboro, NJ (US) 08536; Michael Henry Runge, 1939 Vermont Ave., Toms River, NJ (US) 08755

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/413,280

(22) Filed: Oct. 6, 1999

Related U.S. Application Data (60) Provisional application No. 60/103,444, filed on Oct. 7, 1998.

(51) Int. Cl.$^7$ ................................................. G01W 1/00
(52) U.S. Cl. ........................ 340/601; 340/602; 340/539; 239/63; 137/78.2
(58) Field of Search .................. 340/601, 602, 340/539, 618; 239/67, 63, 65; 137/78.2, 392

(56) References Cited

U.S. PATENT DOCUMENTS

| | | | |
|---|---|---|---|
| 3,808,385 A | | 4/1974 | Klinefelter |
| 4,064,507 A | * | 12/1977 | Schmitz .................. 340/384 E |
| 4,264,902 A | * | 4/1981 | Miller ........................ 340/604 |
| 4,396,149 A | | 8/1983 | Hirsch |
| 4,684,920 A | * | 8/1987 | Reiter ........................ 340/696 |
| 4,760,547 A | | 7/1988 | Duxbury |
| 4,922,433 A | * | 5/1990 | Mark ......................... 364/510 |
| 5,087,886 A | * | 2/1992 | Mann ......................... 340/602 |
| 5,101,083 A | | 3/1992 | Tyler et al. |
| 5,333,785 A | | 8/1994 | Dodds et al. |
| 5,355,122 A | * | 10/1994 | Erickson ..................... 340/602 |
| 5,813,606 A | | 9/1998 | Ziff |
| 5,821,864 A | | 10/1998 | Knop et al. |
| 5,853,122 A | * | 12/1998 | Caprio ....................... 236/44 C |

OTHER PUBLICATIONS

E-mail of Feb. 14, 2001 from Steve Tyler, Buckner, Inc., who is also Patentee of U.S. 5,101,083.
E-mail of Feb. 13, 2001 from Darren Redatzke, Sr., Marketing Manager for Toro, Inc., world's largest manufacturer of irrigation products and rain sensors.
E-mail of Feb. 27, 2001 from Alicia Rodriguez, Product Manager for RainBird's Clemar manufacturing Corp., $2^{nd}$ largest manufacturer of irrigation products, and rain sensors in the world.
E-mail of Feb. 6, 2001 from "Wally", Managing Director of Holman Industries, the largest manufacturer or irrigation controllers in Australia.

* cited by examiner

*Primary Examiner*—Anh La
(74) *Attorney, Agent, or Firm*—Roberts & Mercanti, LLP (57) ABSTRACT

An environmental sensor system that communicates sensor data to a receiving unit using wireless means such as a radio frequency signal. The receiving unit interfaces with a controllable system, possibly affecting its operation. This arrangement allows one or more sensor and transmitter units to be remotely mounted at a distance from the receiver, without regard to installation complications that often result with a hardwired type units. In the preferred embodiment, an irrigation system is interfaced wirelessly with an environmental sensor such as a rain sensor. The rain sensor is contemplated such that in the event of sufficient rainfall, a wireless signal is transmitted to the receiver unit, which in turn interfaces with an irrigation controller resulting in the cessation of watering cycles until the sensor system provides another wireless directive to resume watering.

8 Claims, 5 Drawing Sheets

WIRELESS ENVIRONMENTAL SENSOR SYSTEM

CROSS REFERENCE TO RELATED APPLICATIONS

This application is entitled to the benefit of Provisional Patent Application Ser. No. 60/103,444 filed Oct. 7, 1998.

BACKGROUND

1. Field of Invention

This invention relates to environmental sensors, specifically to environmental sensors that control irrigation systems. More particularly, the present invention relates to the use of a wireless environmental sensor system.

2. Description of Prior Art

This invention relates primarily to the field of automatic irrigation systems like those used for landscape and agricultural watering. Most common types of irrigation systems incorporate a means of controlling the watering cycles via an automatic controller. The need to suspend a watering cycle due to the occurrence of an environmental influence is crucial in order to save natural resources, money, and to prevent unsafe conditions. Such environmental conditions include precipitation, high wind and freezing temperatures. The primary means of halting an automatic watering cycle in this situation is by an operator manually suspending the cycle at the irrigation controller. In most situations this proves to be an ineffective means of conserving resources due to the inconsistent and inefficient methods followed by the operator. In fact, quite often the operator ignores the need to suspend the watering cycle altogether, and in some cases neglects to resume the watering cycle when required, leading to both over-watered and under-watered landscaping, respectively.

It is because of this unreliable and inconvenient manual method that current environmental sensors were developed that allow for an automatic interruption of the controller due to an environmental condition. In particular, the use of rain sensors for irrigation systems has proven to be an effective and economical method of conserving water, energy, and money. This fact can be shown by the increasing number of municipalities throughout the United States who are now requiring that rain sensors be installed on every landscape irrigation system.

Even though reliable, the major drawback of current rain sensors is the extensive installation time and difficult method required for a proper installation. A rain sensor is usually mounted on the side of a structure near its roof in such a manner that it is exposed to the elements equally from all directions. This requires an installer to route a control wire from the sensor to the irrigation system's control box through the structure's wall, in an attic, inside a wall, etc. In some low quality installations the wires are run directly on the outside of the structure's wall, leading to an unattractive installation. Often, this installation is beyond the capabilities of the average home owner, requiring special tools and materials not normally found in the household. Due to the difficult and expensive nature of this installation process, most irrigation systems do not have a rain sensor installed at all, leading to needlessly wasted resources as noted above.

SUMMARY

The present invention allows for a quick, easy, and cost effective installation of an environmental sensor such as a rain sensor, by utilizing wireless transmissions of environmental sensor data. The data is wirelessly received at the location of a control mechanism and is interpreted accordingly in order to affect the operation of the controller as desired.

Specifically, this invention uses wireless technology to transmit the status of an environmental sensor, in particular a rain sensor, to a receiving unit that deactivates the watering cycle of an irrigation system as preprogrammed. The transmitter contains at least one environmental sensor such as a rain sensor, an instant precipitation sensor, a freeze sensor, a wind sensor, or the like, but it need not be integrally housed with the sensor. The receiver may be a stand-alone unit that can be retrofitted to any existing irrigation system, an integral part of a control box that is built in at the time of manufacture, or it may "plug in" as an upgrade to a pre-configured, accepting controller. The communication means between the transmitter and receiver is one that utilizes a wireless technology such as, but not limited to radio frequency, infrared, or ultrasonic. The transmitter unit would transmit a signal to the receiver based on the status of an environmental sensor and the receiver would respond accordingly as predetermined.

Objects and Advantages

Accordingly, besides the objects and advantages of the wireless environmental sensor in our above patent, several objects and advantages of the present invention are:

(a) to provide for much easier and faster installations of environmental sensors for irrigation systems;

(b) to provide for installations requiring minimal expertise and no special tools or materials;

(c) to provide for additional installation locations that could otherwise not be accomplished without undue effort and expense;

(d) to provide for "cleaner" installations without running unsightly wires;

(e) to provide for ease in retrofit type installations, integrating with already installed irrigation systems;

(f) to provide for installation locations that are safer for the installer to access.

Further objects and advantages of our invention will become apparent from a consideration of the drawings and ensuing description.

DRAWING FIGURES

In the drawings, closely related figures have the same number but different alphabetic suffixes.

Reference Numerals in Drawings

| | | | |
|---|---|---|---|
| 2 | environmental sensor | 4 | transmitter control |
| 6 | transmitter | 7 | transmitter module |
| 8 | wireless signal | 10 | receiver |
| 11 | receiver module | 12 | receiver control |
| 14 | controlled system | 16 | structure |
| 18 | system controller | 20 | remote structure |
| 21 | switch | 22 | rain sensor |
| 23 | hygroscopic assembly | 24 | wind sensor |
| 25 | Wind sensor transducer | 26 | wind sensor cup assembly |
| 27 | temperature sensor | 30 | soil sensor |
| 32 | ground | 40 | solar cell |
| 42 | piezoelectric element | | |

DESCRIPTION

Figure 1:
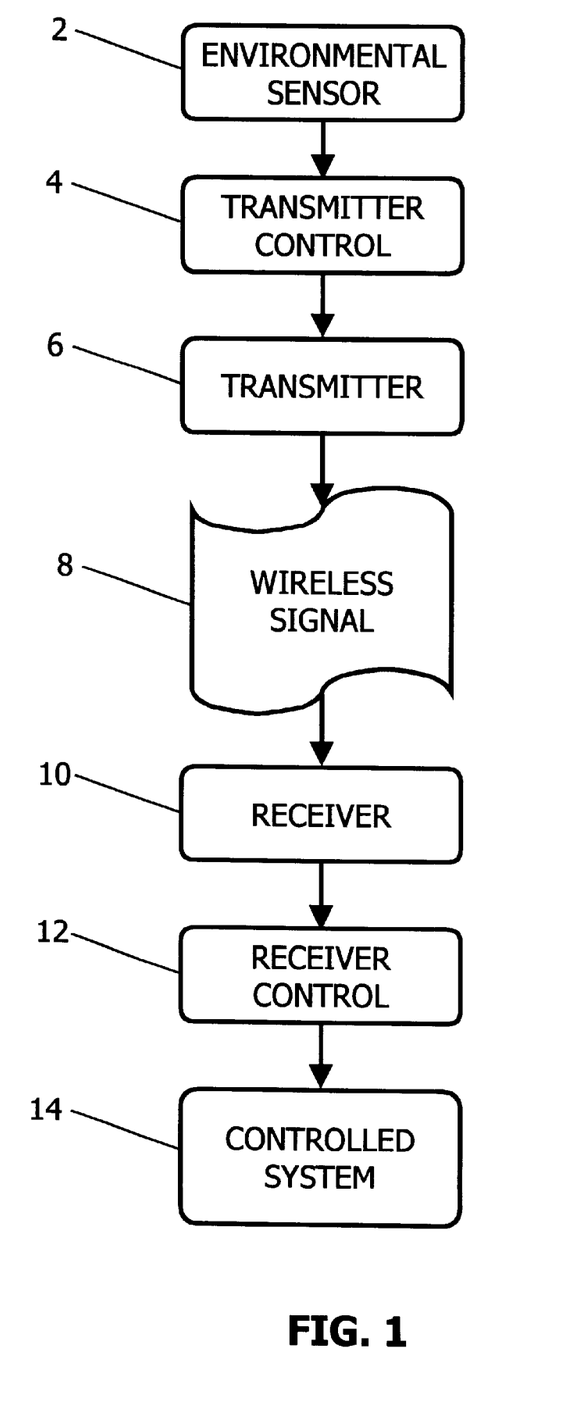
FIG. 1 shows a block diagram of a typical arrangement of the invention.

FIG. 1 shows a block diagram of a typical arrangement of the invention. An environmental sensor 2 is connected to a transmitter control circuit 4. Transmitter control circuit 4 is connected to a transmitter 6. Transmitter 6 communicates via a wireless signal or link 8 with a receiver 10. Receiver 10 is connected to a receiver control circuit 12 which is in turn connected to a controlled system 14.

Figure 2A:
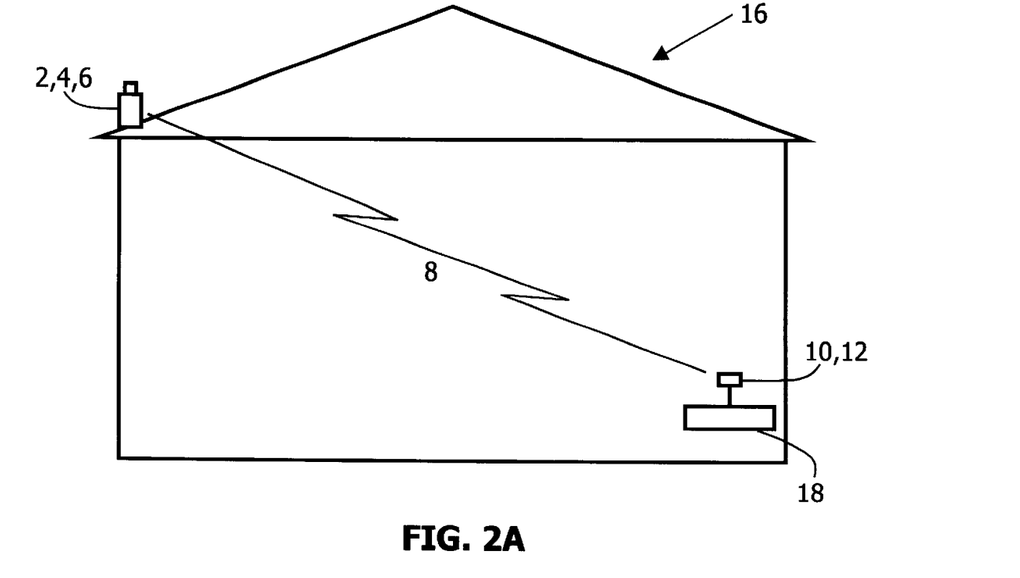
FIG. 2A shows an elevation view of a typical installation of the invention by indicating relative component locations in respect to a typical structure installation.
Figure 2B:
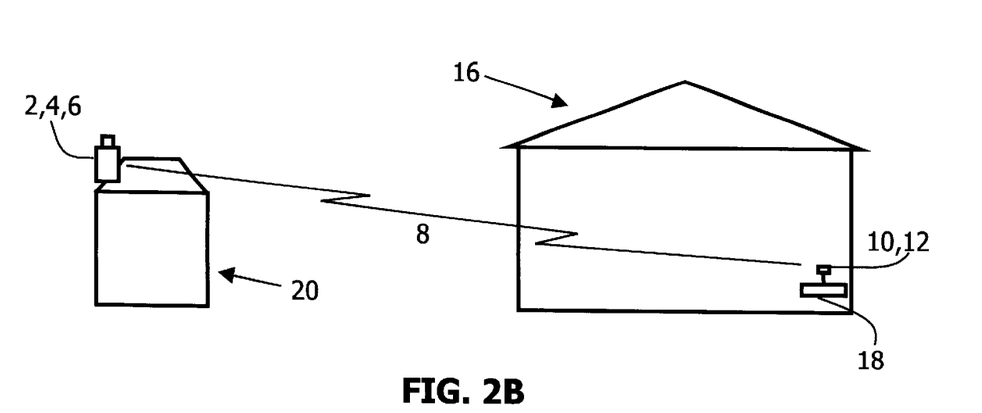
FIG. 2B shows another typical installation, exemplifying the possibility of a remote sensor location, unattached to the structure housing the irrigation control mechanism.

FIGS. 2A and 2B show elevation views of two typical installation configurations of the invention. FIG. 2A shows a building, structure, or dwelling 16 with sensor 2, transmitter control circuit 4, and transmitter 6 mounted on structure 16. Transmitter 6 communicates with receiver 10 via wireless signal 8. Receiver 10 is connected via control circuitry 12 to the system controller 18. FIG. 2A shows one typical installation configuration where transmitter components 2, 4, and 6 are attached to the same structure as receiver components 10 and 12. FIG. 2B shows another typical installation where transmitter components 2, 4 and 6 are mounted on a remote structure 20 that is not physically attached to structure 16 which houses receiver components 10 and 12 which connects to system controller 18.

Figure 3A:
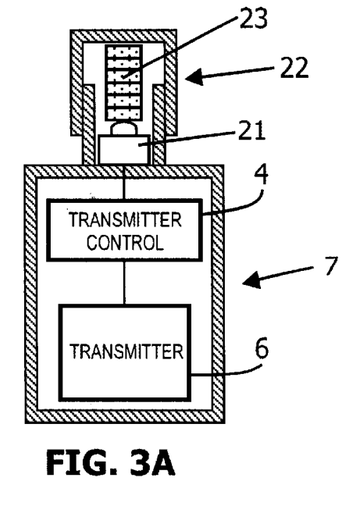
FIG. 3A is a cross-sectional view of the preferred embodiment of the invention, showing a typical sensor and transmitter module configuration, in this instance, a rain sensor as the environmental sensor.

FIGS. 3A–3G show cross-sectioned, elevation views of some typical transmitter component embodiments. FIG. 3A shows a rain sensor 22 connected to a transmitter module 7. Rain sensor 22 in this embodiment is shown with a hygroscopic assembly 23 impinging upon a switch or actuator 21. Switch 21 is wired via control circuitry 4 to transmitter 6.

Figure 3B:
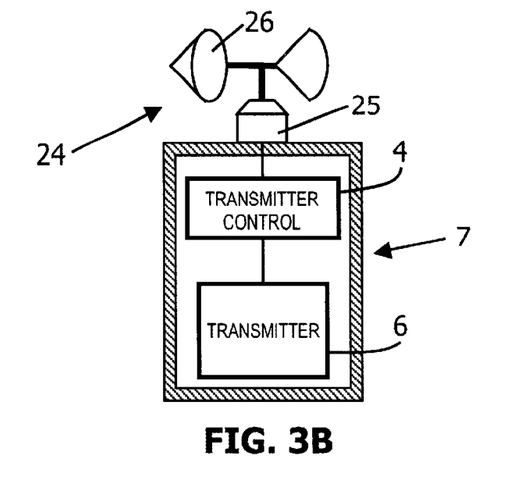
FIG. 3B is a cross-sectional view of one embodiment of the invention, showing a wind sensor as the environmental sensor connected to the transmitter module.

FIG. 3B shows another embodiment, in particular replacing rain sensor 22 of FIG. 3A with a wind sensor 24. In this embodiment, wind sensor 24 comprises a wind sensor cup assembly 26 connected via a wind sensor transducer 25 to transmitter module 7.

Figure 3C:
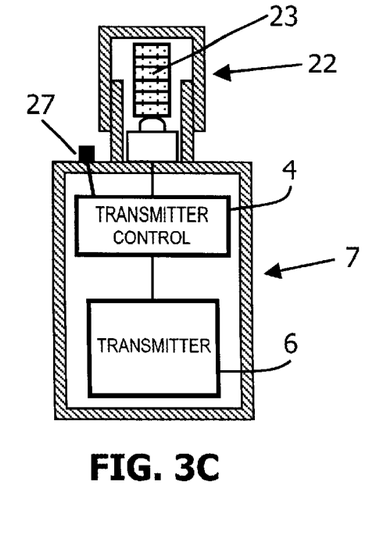
FIG. 3C is a cross-sectional view of one embodiment of the invention, showing the combination of more than one environmental sensor connected to the transmitter module, in this instance a temperature sensor and rain sensor.

FIG. 3C shows another embodiment with the connection of two environmental sensors, a temperature sensor 27 and rain sensor 22 to control circuitry 4.

Figure 3D:
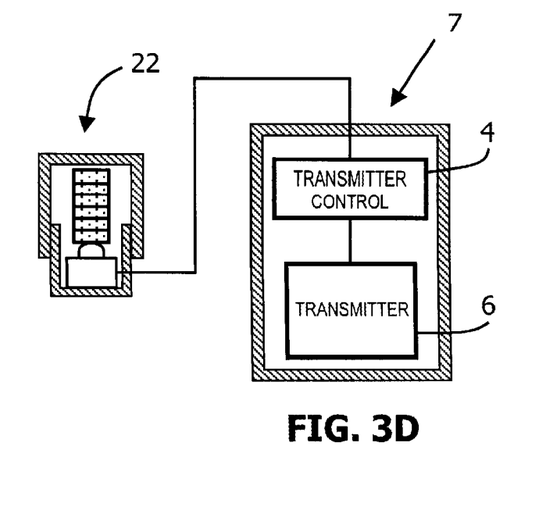
FIG. 3D is a cross-sectional view of one embodiment of the invention, showing a non-integrally housed sensor and transmitter module configuration.

FIG. 3D shows an embodiment where rain sensor 22 and transmitter module 7 are not integrally housed.

Figure 3E:
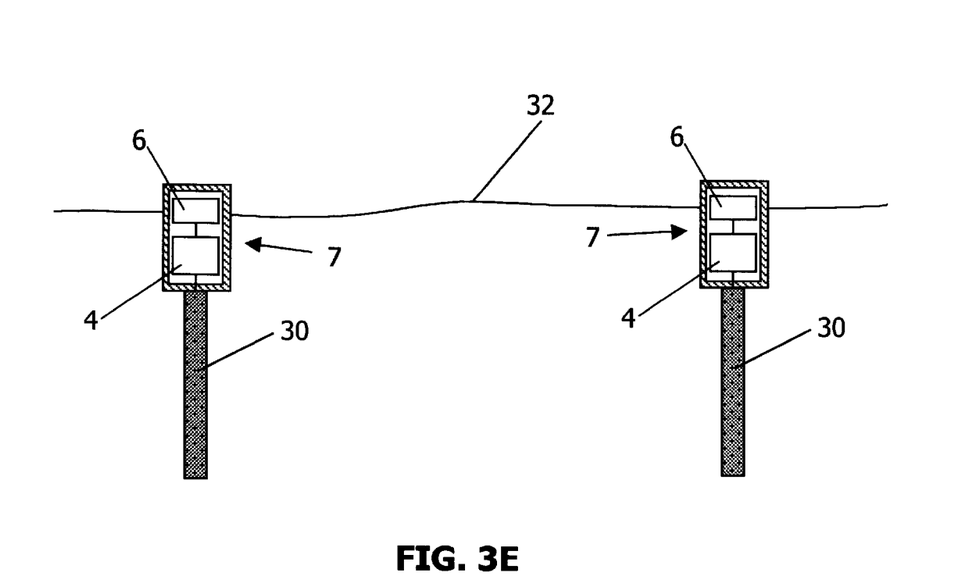
FIG. 3E is a cross-sectional view of one embodiment of the invention, showing a configuration using more than one transmitter module and soil sensors as the environmental sensor.

FIG. 3E shows an embodiment where the environmental sensor is a soil sensor 30 installed in the ground 32. FIG. 3E also shows an embodiment where more than one environmental sensor and transmitter module 7 can be used simultaneously.

Figure 3F:
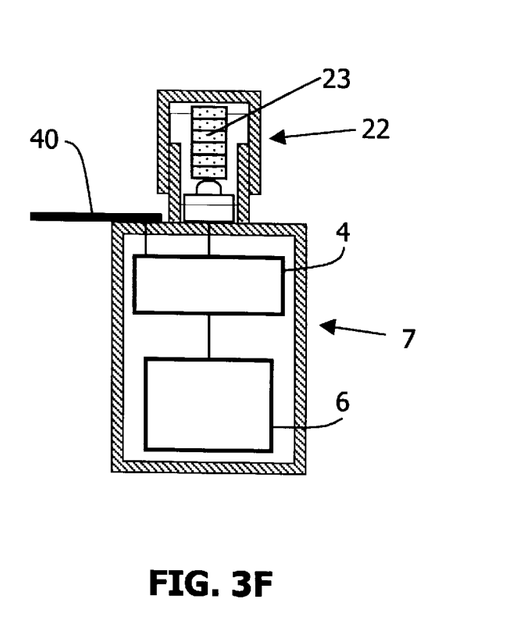
FIG. 3F is a cross-sectional view of one embodiment of the invention, showing the use of a solar cell to power the transmitter module.
Figure 3G:
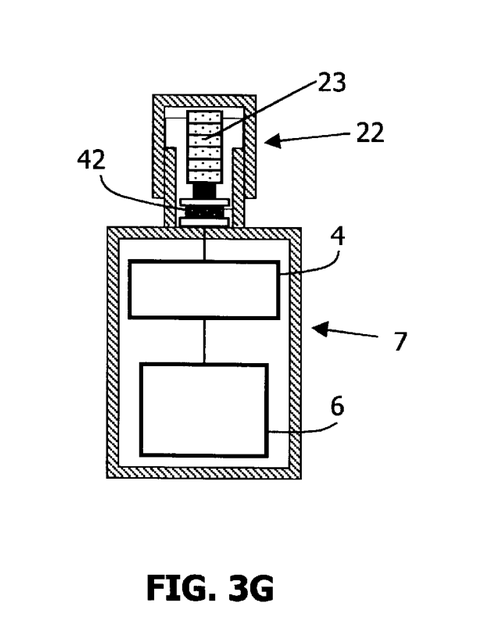
FIG. 3G is a cross-sectional view of one embodiment of the invention, showing the use of a piezoelectric actuator to power the transmitter module.

FIG. 3F shows an embodiment where a photovoltaic type solar cell 40 is connected to the transmitter module 7. Similarly, FIG. 3G shows an embodiment where a piezoelectric element is connected to the transmitter module 7.

Figure 4A:
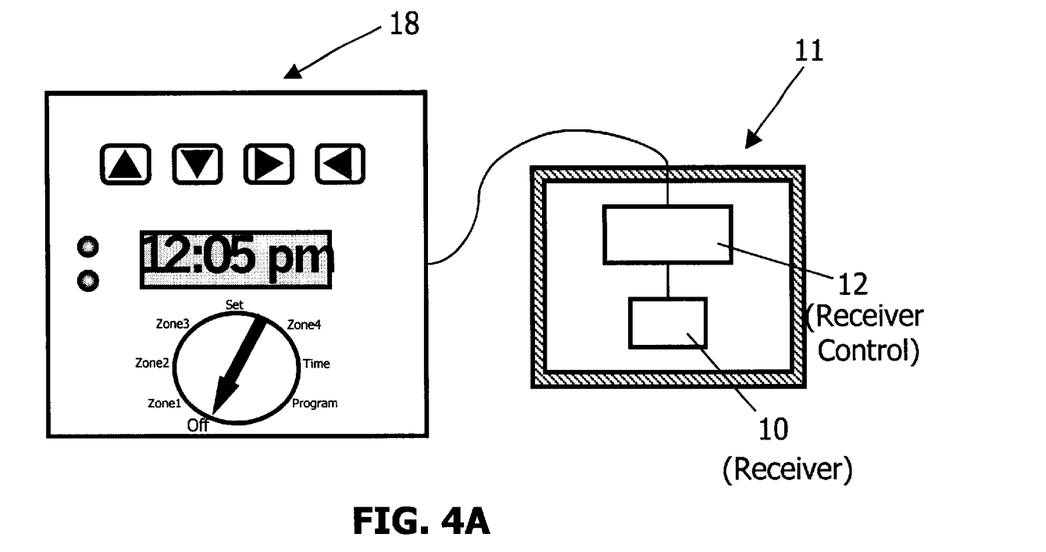
FIG. 4A shows the receiver module in cross section connected to an irrigation system type controller.
Figure 4B:
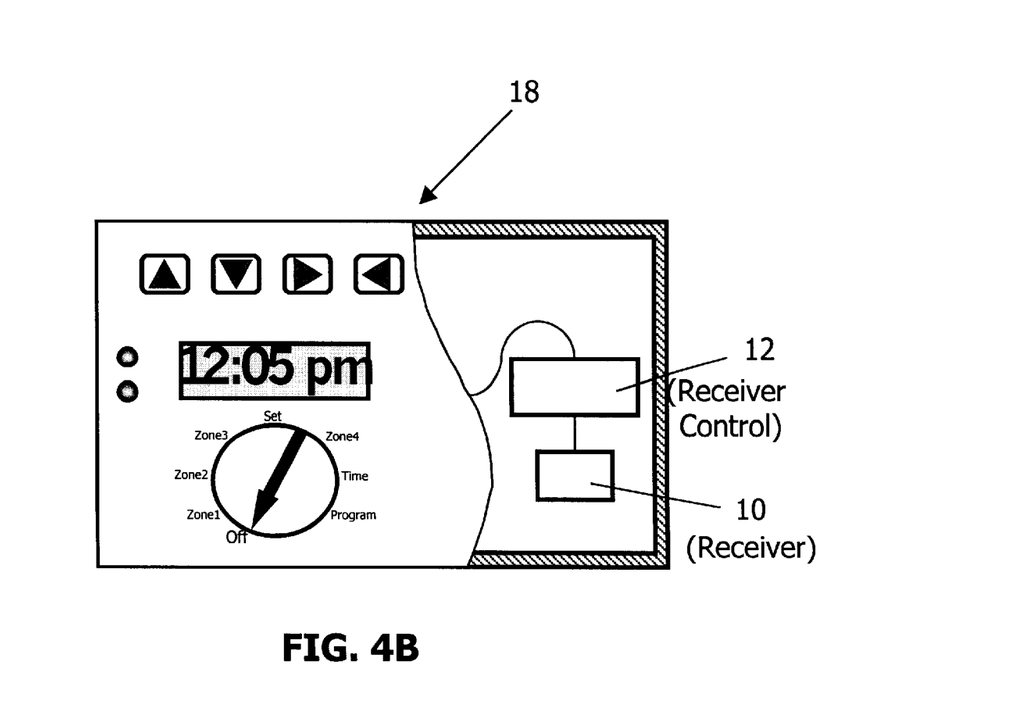
FIG. 4B shows a partial cross section cutaway view of the receiver module integrally housed with the irrigation system controller.

FIGS. 4A and 4B show typical embodiments of the receiver configuration in cross-section and cutaway type elevation views. In FIG. 4A, the receiver module 11 is shown not integrally housed with the system controller 18. Receiver 10 is connected to system controller 18 via receiver control circuitry 12. In FIG. 4B, receiver 10 and receiver control circuitry 12 are integrally housed within system controller 18, however all connections and logic remain the same as in FIG. 4A.

Operation

The manner of using the wireless environmental sensor is very similar to environmental sensors in current use, with one major difference in that the link between the environmental sensor 2 and the controlled system 14 is wireless in the current invention. In traditional sensors, this link is always hardwired.

The overall operation can be described referring to FIG. 1. When an environmental condition such as rainfall is sensed at the environmental sensor 2, the response of sensor 2 is interpreted by transmitter control circuitry 4. Transmitter control circuitry 4 outputs desired information to transmitter 6 which in turn outputs wireless signal 8 to be received at receiver 10. Received signal 8, is interpreted by receiver control circuitry 12 and used to provide information to controlled system 14. The preferred embodiment would pass the received information in a form such that it was usable by irrigation controller 18 as shown in FIG. 4A to affect the watering cycles of controlled system 14.

Typical installations of the current invention as shown in FIGS. 2A and 2B show relative component locations. This figure aids in the visualization of the typical separation between sensor 2 and system controller 18, clearly showing the advantage of utilizing a wireless signal 8.

FIG. 3A shows the preferred embodiment using rain sensor 8 of the hygroscopic disk variety. In this scenario, rain impinges on hygroscopic assembly 23 causing it actuate rain sensor switch 21. A signal from the rain sensor switch 21 is interpreted by transmitter control circuitry 4, which communicates the desired information to transmitter 6. Transmitter 6 then wirelessly relays this information in order to control a system such as an irrigation system. Referring to FIG. 4A, the preferred embodiment of receiver module 11 and system controller 18, wireless signal 8 is then received in proximity to the system controller 18 by the receiver 10. Receiver 10 sends information to receiver control circuitry 12 which interprets and processes the information and outputs data or other form of instructions to system controller 18. Thereby the wireless environmental sensor provides information wirelessly in order to possibly affect the functioning of the controlled system.

FIG. 3D shows essentially the same scenario in regards to the operation of this invention as FIG. 3A, however this embodiment shows that rain sensor 22 can be physically separated from transmitter module 7 while still electrically connected. In a similar fashion, the operation of this invention is also essentially unaffected thorough the use of the additional embodiment shown in FIG. 4B where receiver 10 and receiver control circuitry 12 are integrally housed as part of irrigation system controller 18.

Other typical embodiments utilize different sensors, such as wind sensor 24 of FIG. 3B which transfers wind speed or direction information via wind sensor transducer 25 to the transmitter control circuitry 4. This information is interpreted and relayed wirelessly via the transmitter 6 as in the preferred embodiment.

FIG. 3C shows another embodiment where two environmental sensors, rain sensor 22 and temperature sensor 27, are connected into one transmitter module 7. In this instance, more than one data source is present, from which data is gathered, interpreted, and wirelessly transmitted to affect the controlled system in the desired fashion. Likewise, FIG. 3E shows that more than one transmitter module 7 can be used simultaneously, sending information back to the same receiver if need be. FIG. 3E also introduces another sensor embodiment in that soil sensors 30 are shown providing information on the condition of the soil to the transmitter module 7.

FIGS. 3F and 3G show two additional embodiments in regard to the power source of transmitter module 7. While the preferred embodiment utilizes a portable power source such as a battery contained within the transmitter module 7, FIG. 3F shows how solar cell 40 may be connected to provide power either to directly power the unit, or to charge the installed battery. Likewise, FIG. 3G shows another embodiment where piezoelectric element 42 is used to power or charge the unit.

In addition, referring back to FIG. 1, receiver control circuitry 12 may also perform logic processing that allows for the incorporation of an automatically resetting bypass switch which allows for the current state of the environmental sensor 2 to be ignored in order to perform system checks or maintenance. Control circuitry 4, 12 may also be configured to allow for intelligent environmental condition prediction techniques to be used based on input from one or more environmental sensors 2. It should also be noted that wireless signal 8 can contain data other than sensor state such as battery condition or other system operational data.

Let it be noted that the exact electronics and/or mechanics presented are not important in that many various types of configurations can accomplish the similar task and that it is the method described within that is important. In particular, it is the wireless link between an environmental sensor and control system that is unique and not the exact interconnecting means thereof.

Conclusion, Ramification, and Scope

Thus the reader will see that the wireless environmental sensor system provides for a much easier, simpler, and more cost effective installation of a sensor for use in controlling systems when compared to existing design configurations. Using a wireless sensor system also provides for additional installation locations that could otherwise not be accomplished without undue effort and expense. Safer installations can also be accomplished in that often no ladder work at height is required to install a wireless sensor, whereas traditional designs quite often necessitate this. Installations of a wireless environmental sensor system also require no special tools unlike installations of existing designs. Installations of a wireless sensor system is aesthetically more professional with no dangling wires or holes drilled in the sides of buildings.

While our above description contains many specificities, these should not be construed as limitations on the scope of the invention, but rather as an exemplification of preferred embodiments thereof. Many other variations are possible. For example, an irrigation system controller could be sold with transmitting and receiving units built-in to which a separately sold environmental sensor could be connected and still fall within the scope of this invention. Moreover, a sensor and transmitter unit could be sold as a separate device compatible with a controller that has a receiver module built-in. Further examples include using the invention to control home automation functions such as closing windows during rain, or making use of a pressure, light, or precipitation sensor, or controlling the irrigation system without using the controller such as controlling the water supply pump directly. Other applications are also possible, such as automotive, marine, or commercial building system control.

Accordingly, the scope of the invention should be determined not by the embodiments illustrated, but by the appended claims and their legal equivalents.

We claim:

1. An atmospheric precipitation sensor system for deactivating the timed preprogrammed watering cycle of an irrigation system, regardless of the level of moisture in the soil, said irrigation system including a controller responsive to control information for affecting the operation of the associated irrigation system, said atmospheric sensor system comprising:

a nonelectrical sensor designed for sensing atmospheric precipitation, said sensor being mounted above ground, said sensor including hygroscopic material that expands upon contact with moisture from water vapor, rain, snow, or ice;

a radio frequency, infrared, or ultrasonic transmitter for wirelessly transmitting signals;

an electrical switch connected mechanically to said hygroscopic material, and electrically to said transmitter, said switch being responsive to said hygroscopic material expanding a given amount indicative of a predetermined level of atmospheric precipitation, for enabling said transmitter to transmit signals indicative of said predetermined level of atmospheric precipitation being attained;

a remotely located receiver receptive of said wireless signals from said transmitter, for converting the signals into electrical control information, for application to said controller of said irrigation system for affecting timed preprogrammed operation of said irrigation system, said controller being responsive to the presence of said electrical control information for terminating any present or programmed future operation of said irrigation system, said controller being further responsive to the termination of said electrical control information for resuming timed preprogrammed operation of said irrigation system.

2. The atmospheric precipitation sensor system of claim 1, further including a plurality of sensor selected from the group consisting of a temperature sensor, a light sensor, a pressure sensor, a wind sensor, and combinations thereof.

3. The atmospheric precipitation sensor system of claim 1, wherein said transmitter includes at least one energy source, and said at least one energy source is selected from the group consisting of electric power, battery power, solar energy, light energy, hygroscopic expansion energy, wind energy, temperature dependent expansion energy, and combinations thereof.

4. The atmospheric precipitation sensor system of claim 1, wherein said wirelessly transmitted signals further contain operational data of said sensor system.

5. The atmospheric precipitation sensor system of claim 1, further comprising a bypass switch which allows the current state of the non-electrical sensor to be ignored.

6. The atmospheric precipitation sensor system of claim 5 wherein the bypass switch is automatically resetting.

7. The atmospheric precipitation sensor system of claim 1 comprising receiver control circuitry and wherein the receiver and receiver control circuitry are integrally housed within the controller.

8. A sensor system for an irrigation system having a timed preprogrammed watering cycle controller, said sensor system comprising:

a sensor for sensing at least one atmospheric environmental condition selected from the group consisting of atmospheric precipitation regardless of the level of moisture in the soil, atmospheric ambient temperature, wind strength, or combinations thereof, said sensor being mounted above ground;

a radio frequency, infrared, or ultrasonic transmitter for wirelessly transmitting signals;

means for connecting said sensor to said transmitter, said transmitter being responsive to sensing conditions of said sensor, for transmitting signals indicative of the same;

a remotely located receiver responsive to signals from said transmitter for producing electrical control information;

a means for interfacing said receiver to said irrigation system, whereby said irrigation system's timed preprogrammed watering cycle controller is deactivated by occurrence of conditions sensed by said sensor conveyed by the presence of said electrical control information, for deactivating present or future watering cycles.

\* \* \* \* \*

(12) EX PARTE REEXAMINATION CERTIFICATE (5703rd)
United States Patent
Runge et al.

(10) Number: US 6,452,499 C1
(45) Certificate Issued: Mar. 13, 2007

(54) WIRELESS ENVIRONMENTAL SENSOR SYSTEM

(75) Inventors: Thomas Henry Runge, Manasquan, NJ (US); Bruce Martin Downie, Plainsboro, NJ (US); Michael Henry Runge, Toms River, NJ (US)

(73) Assignee: The Toro Company, Bloomington, MN (US)

Reexamination Request:
No. 90/007,119, Jul. 15, 2004

Reexamination Certificate for:
Patent No.: 6,452,499
Issued: Sep. 17, 2002
Appl. No.: 09/413,280
Filed: Oct. 6, 1999

Related U.S. Application Data
(60) Provisional application No. 60/103,444, filed on Oct. 7, 1998.

(51) Int. Cl.
*G01W 1/00* (2006.01)

(52) U.S. Cl. .................. 340/601; 137/78.2; 239/63; 340/539.1; 340/539.26; 340/602

(58) Field of Classification Search ............... 340/601, 340/602, 539.26, 539.28, 618; 239/63, 67, 239/65; 137/78.2, 392
See application file for complete search history.

(56) References Cited

U.S. PATENT DOCUMENTS

| | | | |
|---|---|---|---|
| 3,808,385 A | | 4/1974 | Klinefelter |
| 4,916,642 A | | 4/1990 | Kaiser et al. .................. 165/22 |
| 4,922,433 A | | 5/1990 | Mark |
| 5,499,024 A | * | 3/1996 | Germanton et al. ... 340/870.17 |
| 5,740,038 A | * | 4/1998 | Hergert ...................... 700/284 |
| 6,005,517 A | * | 12/1999 | Friedrichs ................... 342/457 |

OTHER PUBLICATIONS

Rain Bird, Central Control System, Maxicom, Jun. 1994, pp. 2–8, Rain Bird Sales, Inc., US.
Rain Bird, Components of the Maxicom System, Feb. 9, 1994, p. 3.2, Section 3, US.
Rain Bird, Central Control System, Maxicom, Feb. 1993, TOC and pp. 5.4–1–2; 5.4–41–42;7.2–1–2; Rain Bird Sales, Inc. US.
Rain Bird, Guide to Operations, Maxicom, Oct. 1994, Chapter 7, US.
Rain Bird, Central Computer Control System, Maxicom, "Landscape Irrigation Products, 1993–1994 Catalog", pp. 98–99, US.

* cited by examiner

*Primary Examiner*—Brent A. Swarthout (57) ABSTRACT

An environmental sensor system that communicates sensor data to a receiving unit using wireless means such as a radio frequency signal. The receiving unit interfaces with a controllable system, possibly affecting its operation. This arrangement allows one or more sensor and transmitter units to be remotely mounted at a distance from the receiver, without regard to installation complications that often result with a hardwired type units. In the preferred embodiment, an irrigation system is interfaced wirelessly with an environmental sensor such as a rain sensor. The rain sensor is contemplated such that in the event of sufficient rainfall, a wireless signal is transmitted to the receiver unit, which in turn interfaces with an irrigation controller resulting in the cessation of watering cycles until the sensor system provides another wireless directive to resume watering.

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 8 is cancelled.

Claims 1 and 7 are determined to be patentable as amended.

Claims 2–6, dependent on an amended claim, are determined to be patentable.

New claims 9–18 are added and determined to be patentable.

1. An atmospheric precipitation sensor system for deactivating the timed preprogrammed watering cycle of an irrigation system, regardless of the level of moisture in the soil, said irrigation system including a *single* controller *being* responsive to control information for affecting the operation of the *single controller of the* associated irrigation system, said atmospheric sensor system comprising:
   a nonelectrical sensor designed for sensing atmospheric precipitation, said sensor being mounted above ground, said sensor including hygroscopic material that expands upon contact with moisture from water vapor, rain, snow, or ice;
   a radio frequency, infrared, or ultrasonic transmitter for wirelessly transmitting signals;
   an electrical switch connected mechanically to said hygroscopic material, and electrically to said transmitter, said switch being responsive to said hygroscopic material expanding a given amount indicative of a predetermined level of atmospheric precipitation, [for] *said switch providing signals to a transmitter control circuitry which interprets said signals and communicates desired information to said transmitter, said transmitter control circuitry* enabling said transmitter to transmit signals indicative of said predetermined level of atmospheric precipitation being attained;
   a remotely located receiver receptive of said wireless signals from said transmitter, [for] *and providing said received signals to a receiver control circuitry which interprets and processes information in said signals, said receiver control circuitry* converting the signals into electrical control information, for application to said *single* controller of said irrigation system for affecting timed preprogrammed operation of said *single controller of said* irrigation system, said *single* controller being responsive to the presence of said electrical control information for terminating any present or programmed future operation of said *single controller of said* irrigation system, said *single* controller being further responsive to the termination of said electrical control information for resuming timed preprogrammed operation of said *single controller of said* irrigation system.

7. The atmospheric precipitation sensor system of claim 1 comprising receiver control circuitry and wherein the receiver and receiver control circuitry are integrally housed within the *single* controller.

*9. An atmospheric precipitation sensor system according to claim 1, further comprising:*
   *a housing;*
   *said non-electrical sensor, said transmitter and said electrical switch each being disposed in said housing.*

*10. An atmospheric precipitation sensor system according to claim 9, wherein said housing is sized and shaped for placement on a building structure at a location near a roof of said building structure.*

*11. An atmospheric precipitation sensor system according to claim 1, further comprising:*
   *a first and second housing;*
   *said non-electrical sensor and said electrical switch each being disposed in said first housing;*
   *said transmitter being disposed in said second housing;*
   *said second housing located adjacent to said first housing.*

*12. An atmospheric precipitation sensor system according to claim 1, wherein said transmitter is positioned adjacent said non-electrical sensor.*

*13. An atmospheric precipitation sensor system according to claim 12, wherein said non-electrical sensor is fixed to a building structure at a location spaced from the ground.*

*14. An atmospheric precipitation sensor system according to claim 1, wherein said transmitter has the sole function of wirelessly transmitting said signals to said single controller.*

*15. An atmospheric precipitaton sensor system according to claim 1, wherein said timed preprogrammed watering cycle for said single controller is executed solely by said single controller.*

*16. An atmospheric precipitaton sensor system according to claim 1, wherein said transmitter, said non-electrical sensor and said electrical switch are each sized and shaped for placement on a building structure at a location near a roof of said building sructure.*

*17. An atmospheric precipitation sensor system according to claim 1, further comprising a battery connected to said transmitter, said battery providing a source of electrical energy for the operation of said transmitter.*

*18. An atmospheric precipitation sensor system according to claim 1, further comprising a solar cell for providing power to said transmitter.*

* * * * *